(12) United States Patent
Kurts et al.

(10) Patent No.: US 9,716,646 B2
(45) Date of Patent: Jul. 25, 2017

(54) USING THRESHOLDS TO GATE TIMING PACKET GENERATION IN A TRACING SYSTEM

(71) Applicant: Intel Corporation, Santa Clara, CA (US)

(72) Inventors: Tsvika Kurts, Haifa (IL); Beeman C. Strong, Portland, OR (US); Ofer Levy, Atlit (IL); Gabi Malka, Haifa (IL); Zeev Sperber, Zichron Yackov (IL)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 14/334,071

(22) Filed: Jul. 17, 2014

(65) Prior Publication Data

US 2016/0020897 A1 Jan. 21, 2016

(51) Int. Cl.
*H04L 7/00* (2006.01)
*H04L 12/26* (2006.01)
*H04J 3/06* (2006.01)

(52) U.S. Cl.
CPC ............ *H04L 43/50* (2013.01); *H04J 3/0664* (2013.01); *H04L 43/106* (2013.01)

(58) Field of Classification Search
CPC ....... H04L 43/50; H04L 43/106; H04J 3/0664
See application file for complete search history.

(56) References Cited

U.S. PATENT DOCUMENTS

| 2004/0153813 A1* | 8/2004 | Swoboda | G06F 11/261 714/36 |
| 2011/0161714 A1* | 6/2011 | Glass | H04L 7/00 713/400 |

\* cited by examiner

*Primary Examiner* — Melvin Marcelo
(74) *Attorney, Agent, or Firm* — Lowenstein Sandler LLP

(57) ABSTRACT

In accordance with embodiments disclosed herein, there is provided systems and methods for using thresholds to gate timing packet generation in a tracing system (TS). For example, the method may include generating and outputting a trace data (TD) packet into a packet log. The method also includes generating and outputting a timing packet (TM) corresponding to the TD packet into the packet log when a number of clock cycles elapsed since an output of a previous TM packet exceeds a clock threshold value.

20 Claims, 15 Drawing Sheets

US 9,716,646 B2

USING THRESHOLDS TO GATE TIMING PACKET GENERATION IN A TRACING SYSTEM

TECHNICAL FIELD

The embodiments of the disclosure relate generally to processing devices and, more specifically, relate to utilization of a threshold mechanism to limit output of timing packets in a tracing system.

BACKGROUND

A tracing system (TS) is a tracing capability, which provides a trace of software execution in a processor. This may include indication of changes in control flow, addresses accessed by load or store instructions, or other dynamic indication of software behavior. The trace output is in the form of packets of variable sizes. Such packets may include trace data (TD) packets and timing packets (TM).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
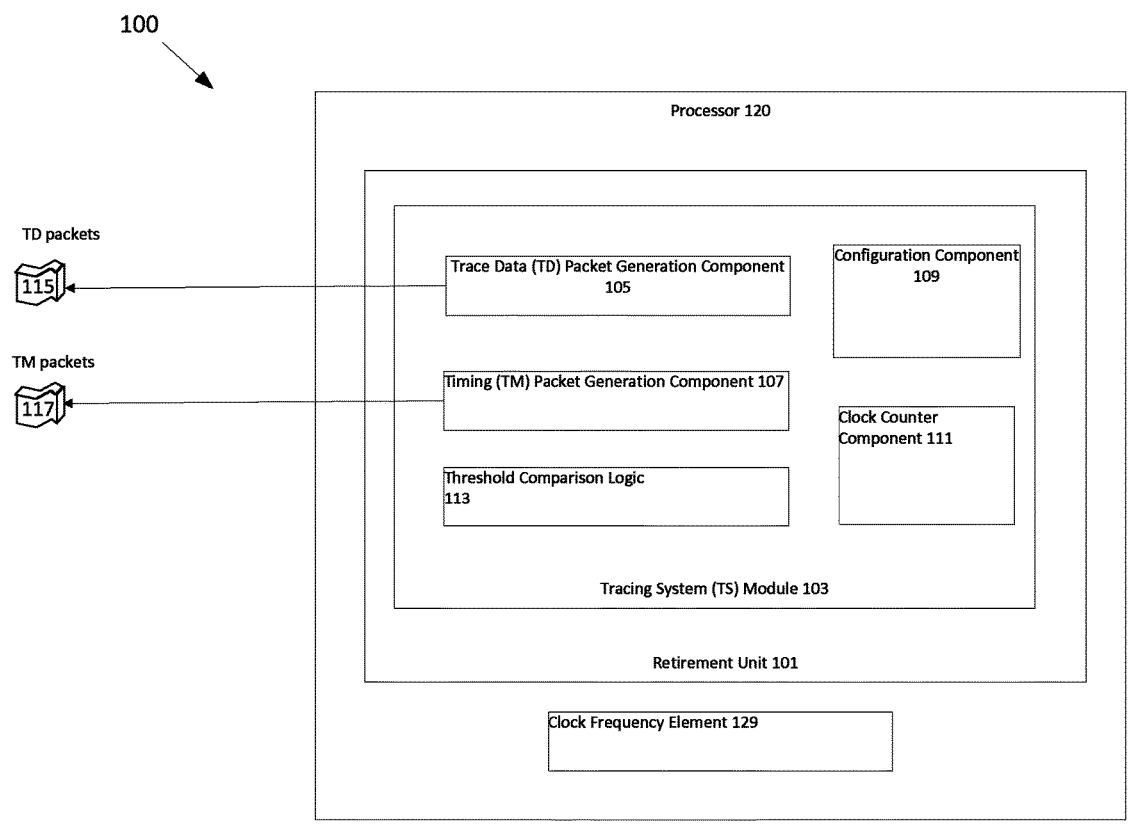
FIG. 1A illustrates an exemplary tracing system (TS) architecture of a processing device in accordance with which embodiments may operate.

Disclosed herein are embodiments for outputting a timing packet (TM) in a tracing system (TS). In one embodiment, the TM packet may be outputted when a number of clock cycles elapsed since an output of a previous TM packet exceeds a clock threshold value. The clock threshold value may be pre-defined as a specific number of clock cycles. The TM packet may be outputted corresponding to a trace data (TD) packet in the TS.

The output packet stream of the TS may typically consist of TD packets and a TM packet issued together with each of the TD packets. The TM packet provides a number of clock cycle counts that have passed between consecutive TD packets. As such, the TM packet provides an ability to analyze processor performance over the course of the trace, as well as an ability to align the trace with other logs or events that have related timing information. In many cases, timing granularity at the level of each packet is unnecessary, and undesirable given the correspondingly higher trace data rate associated with generating a TM packet with each TD packet. Elevated trace data rates can require larger trace output buffers, longer trace decode times, increased interference with the software being traced, and increased likelihood of trace data loss due to internal buffer overflow.

Embodiments of the disclosure introduce an ability to trade off precision in timing information, in exchange for reduced trace size and bandwidth. In one embodiment, a TS prevents generating and outputting the TM packet with every TD packet in the output packet stream. In one embodiment, the TM packet is generated and outputted with the TD packet when a clock threshold value is fulfilled. The clock threshold value may be pre-defined based on a specific task to be performed in the TD.

In some embodiments, the clock threshold is pre-defined with a specific number of clock cycles. A user may set the clock threshold to define its required timestamp resolution. In one embodiment, a TM packet may be generated and outputted with the TD packet when a total number of clock cycles that have elapsed since the last TM packet exceeds the predefined clock threshold. In one embodiment, the TM packet is generated and outputted only when the total number of clock cycles that have elapsed since the last TM packet exceeds the predefined clock threshold. In some embodiments, the TM packet is outputted adjacent to the TD packet. The TM packet may be appended to the TD packet, or it may precede the TD packet.

The above technique of reducing frequency of issuance of the TM packet in the TS has many advantages. One such advantage is the ability to obtain information associated with performance of the TD at a higher level. More specifically, the information is provided in a resolution provided by the user for that specific task, which helps a user to concentrate on information according to a nature of the specific task. Also, by reducing the number of TM packets issued into the TS output packet stream, the total number of data binary bytes may be reduced, thus reducing the memory bandwidth and output buffer size required for TS use. In some tracing systems, where enabling trace has a performance impact, this may also reduce the performance impact of generating trace data.

In the following description, numerous specific details are set forth (for example, specific TD logic implementations, TD packet formats, hardware/firmware partitioning details, logic partitioning/integration details, processor configurations, micro-architectural details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

FIG. 1A illustrates an exemplary architecture 100 of a processor (also referred to herein as "processing device") in accordance with which embodiments may operate. Architecture 100 includes TS architecture that generates real time TD packets 115 and TM packets 117. In one embodiment, the processing device is a central processing unit (CPU).

In one embodiment, processing device 120 includes a retirement unit 101. Retirement unit 101 can include a TS module 103, which receives information from the retirement unit 101 and packetizes the information to output the TD packets 115 and the TM packets 117 in a TS output packet stream.

The TS module 103 includes a trace data packet generation component (TDPGC) 105, which in turn generates and writes the TD packets 115 to the TS output packet stream. Trace Event 1 (TE1) and Trace Event 2 (TE2) are generic examples of TD packets that could be generated by a TS to indicate some specific events in the trace. Examples of such events could include, but are not limited to, taken branch completion, external interrupt receipt, processor frequency change, or memory store completion.

The TS module 103 may also include a timing packet generation component (TMPGC) 107, which in turn generates and writes the TM packets 117 to the TS output packet stream. The TM packets 117 are outputted adjacent to the TD packets 115.

The processor 120 also includes a clock frequency element 129. The clock frequency element 129 may receive a reference clock signal that is used to generate clock cycle information as the timing information. Frequency may refer to the number of occurrences of a repeating event per unit time. The cycle information may be appended to other packets and may indicate the number of clock cycles elapsed between consecutive packets. The cycle packets may be issued with core clock resolution. In one embodiment, the clock frequency element 129 outputs the current clock cycles of the processor to the TS module 103.

The TS module 103 may also include a clock counter component 111. The clock counter component 111 counts number of clock cycles generated by the clock frequency element 129 as described above.

The TS module 103 includes a threshold comparison (TC) logic 113, which compares the number of clock cycles counted by the clock counter component 111 to a clock threshold value. As discussed above, the clock threshold value may be pre-defined based on a specific task to be performed in the TD. Also, as discussed above, in some embodiments, the clock threshold value is pre-defined with a specific number of clock cycles. The clock threshold value may be assigned by a user, such as an administrator of the system containing the processor 120. The clock threshold value options may include, but are not limited to, 16 clock cycles, 32 clock cycles or 64 clock cycles. In one embodiment, when the number of clock cycles exceeds the clock threshold value, the TC logic 113 will allow a TM packet to be generated with the next TD packet. When the TD packet is generated by the TDPGC 105, the TC logic 113 sends a command signal to the TMGC 107 to generate and output the TM packet 117 into the TS output packet stream. The TMGC 107 outputs the TM packet 117 along with the generated TD packet 115, to the TS output packet stream. In one embodiment, the TM packet 117 is appended to the TD packet 115 in the TS output packet stream. The clock counter component 111 is reset after outputting of the TM packet 117 into the TS output packet stream. In one embodiment, the clock counter component 111 is reset to zero. As such, the clock counter component 111 re-starts counting the cycle counts generated by the clock frequency element 129.

In one implementation, the TM packet 117 is generated and outputted into the TS output packet stream without the TD packet 115. Such implementation may occur when there is an overflow in the clock counter component 111. The overflow in the clock counter component 111 may occur when a number of clock cycles have been counted without generating and outputting a TD packet 115. For example, if the clock counter component 111 is a 12 bit counter, when 4,095 clock cycles have been counted and not a single TD packet has been issued, then at the next clock cycle a TM packet 117 with value 4096 is outputted into the TS output packet stream.

The TS module 103 may also include a configuration component 109, which may allow software or firmware to configure the inclusion of the TM packets 117 in the TS packets 115. In addition, the configuration component 109 may establish and manage the clock threshold value.

Figure 1B:
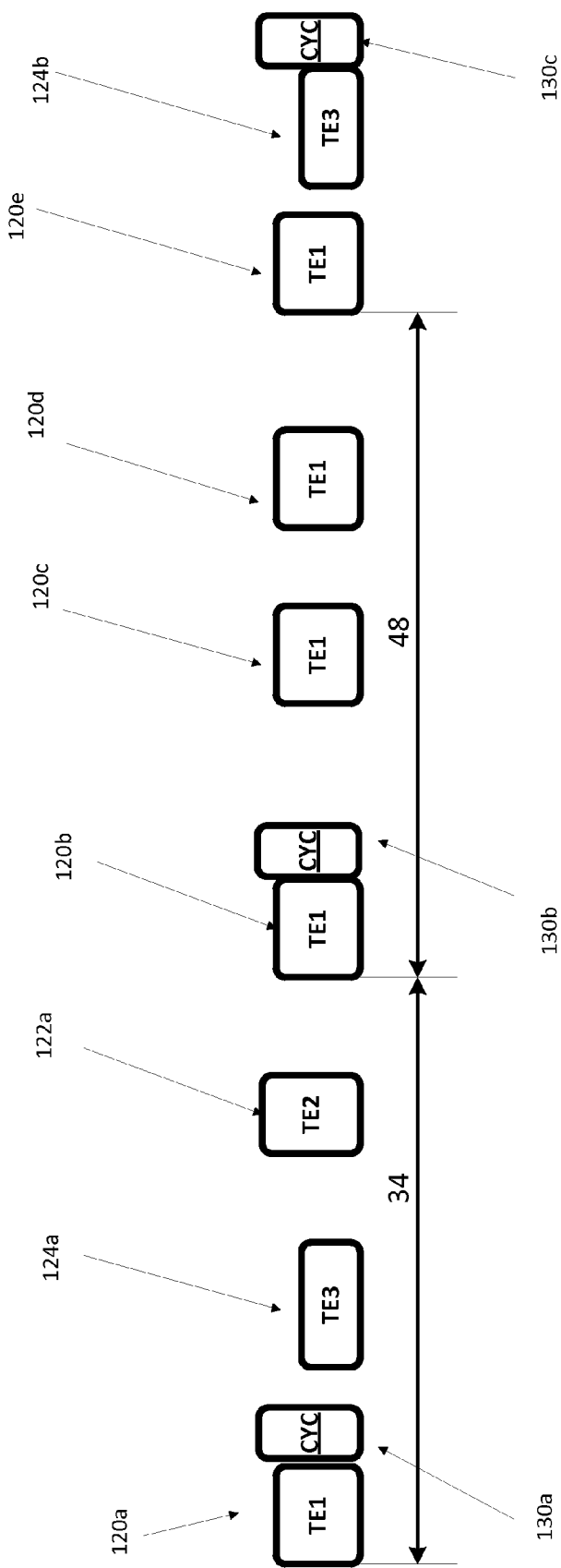
FIG. 1B illustrates an example trace output, including TD and TM packets, from a TS.

FIG. 1B illustrates an example of TD packets 115 and TM packets 117 generated and outputted into a TS output packet stream by the TS module 103 when a clock threshold is set to 32 clock cycles, for example. As shown, the TD packets 115 may include, but are not limited to, trace event 1 (TE1) packets 120a-120n, trace event 2 (TE2) packets 122a-122n and trace event 3 (TE3) packets 124a-124n. The TM packets 117 may include clock cycle (CYC) packets 130a-130n.

As shown in FIG. 1B, initially a CYC packet 130a is generated and outputted into the TS output packet stream upon the generation and output of a TD packet, which in this example is TE1 packet 120a. As shown, the CYC packet 130a is appended to the TE1 packet 120a in the TS output packet stream. After outputting the CYC packet 130a into the TS output packet stream, the clock counter component 111 is reset to zero, and continues counting the clock cycles.

Another CYC packet 130b is then generated and outputted into the TS output packet stream when the number of counted clock cycles exceeds the clock threshold of 32 (in this example, counted clock cycles reaches 34) and the next TD packet (i.e., TE1 packet 120b) is generated and outputted into the TS output packet stream. As shown in FIG. 1B, one or more other TD packets such as the TE3 packet 124a and the TE2 packet 122a are generated and outputted into TS output packet stream without corresponding CYC packets. This occurs because the clock threshold of 32 had not been exceeded by the clock counter component 111.

After outputting CYC packet 130b into the TS output packet stream, the clock counter component 111 resets to zero and continues to count the clock cycles. When the number of clock cycles exceeds the clock threshold of 32, a CYC packet 130c can be generated and appended to the next TD packet occurring in the TS output packet stream. In this example, the next TD packet after the clock threshold of 32 is exceeded is TE3 packet 124b, which occurs 48 clock cycles after the issuance of the previous CYC packet 130b into the TS output packet stream. Immediately after the TE3 packet 124b is generated, a third CYC packet 130c is generated and appended to the TE3 packet 124b to be outputted into the TS output packet stream.

Figure 2A:
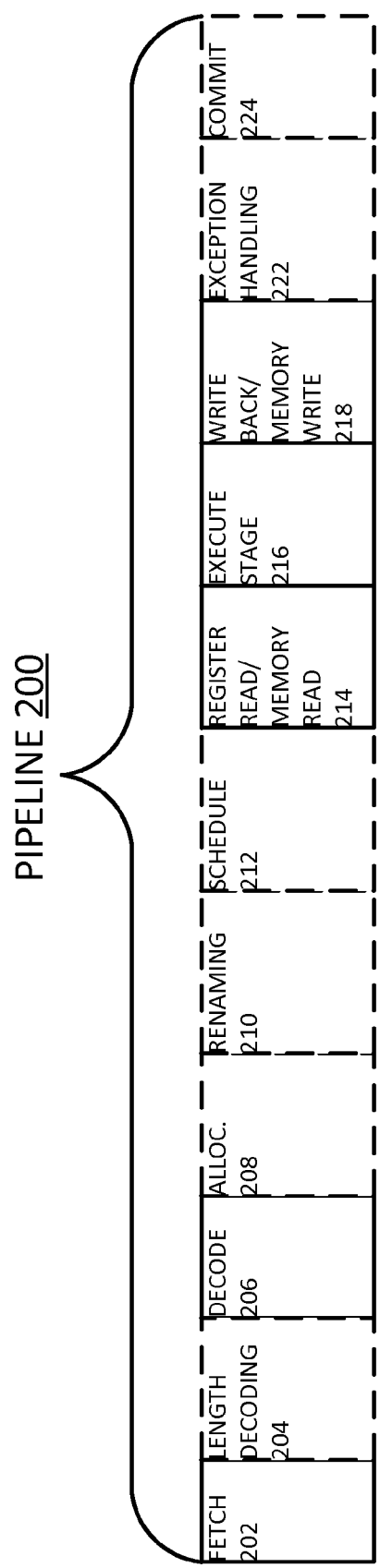
FIG. 2A is a block diagram illustrating both an exemplary in order pipeline and an exemplary register renaming, out-of-order issue/execution pipeline in accordance with described embodiments.
Figure 2B:
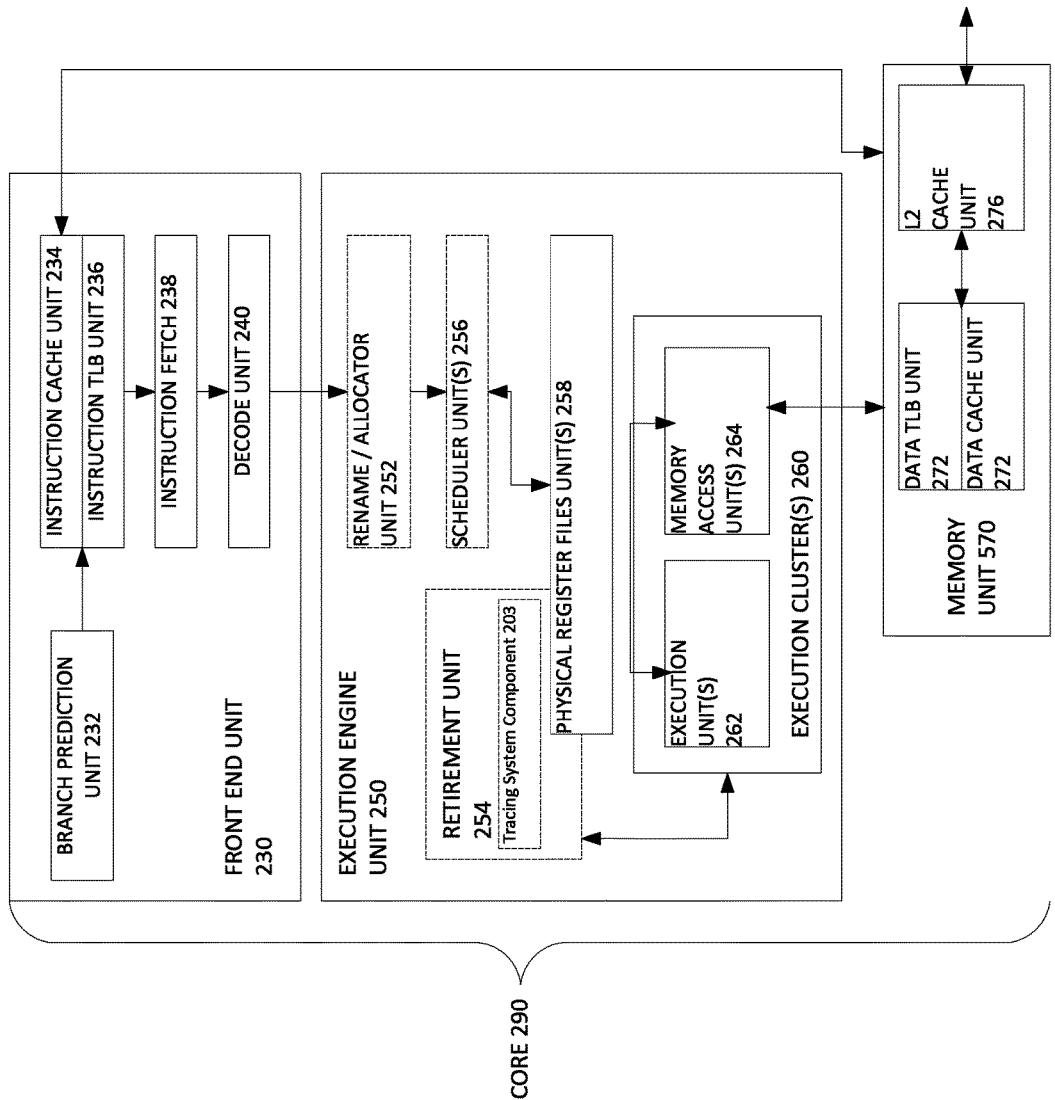
FIG. 2B is a block diagram illustrating both an exemplary embodiment of an in-order architecture core and an exemplary register renaming, out-of-order issue/execution architecture core to be included in a processor in accordance with described embodiments.

FIG. 2A is a block diagram illustrating an in-order pipeline and a register re-naming stage, out-of-order issue/execution pipeline of a processor outputting timing packets (TM) in TS according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrates the register renaming, out-of-order issue/execution pipeline. Similarly, the solid lined boxes in FIG. 2B illustrate the in-order architecture logic, while the dashed lined boxes illustrates the register renaming logic and out-of-order issue/execution logic.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224. In some embodiments, the stages are provided in a different order and different stages may be considered in-order and out-of-order.

In FIG. 2B, arrows denote a coupling between two or more units and the direction of the arrow indicates a direction of data flow between those units. FIG. 2B shows processor core 290 including a front end unit 230 coupled to an execution engine unit 250, and both are coupled to a memory unit 70.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 234 is further coupled to a level 2 (L2) cache unit 276 in the memory unit 270. The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The retirement unit 254 may include a TS component 203 to generate TD packets. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 258 is overlapped by the retirement unit 254 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 254 and the physical register file(s) unit(s) 258 are coupled to the execution cluster(s) 460. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 38 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 3:
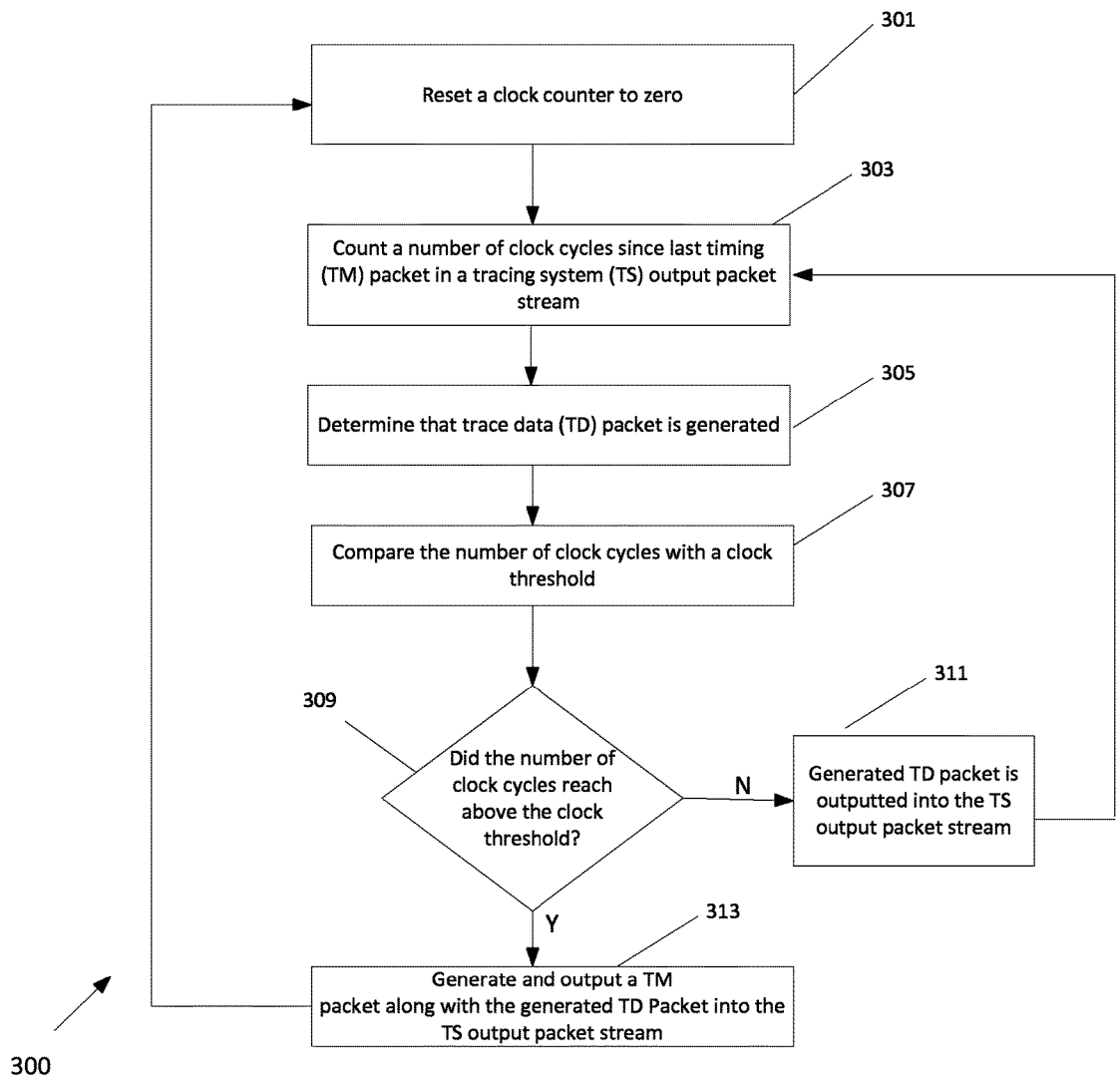
FIG. 3 is a flow diagram illustrating an example of a method for outputting the timing packets into the TS.

FIG. 3 is a flow diagram illustrating an example of a method 300 for outputting a TM packet into the TS. Method 300 may be performed by processing logic that may include hardware (e.g. circuitry, dedicated logic, programmable logic, microcode, etc.). The numbering of the blocks presented is for the sake of clarity and is not intended to prescribe an order of operations in which the various blocks may occur. In one embodiment, method 300 is performed by TS module 103 described with respect to FIG. 1.

Beginning with block 301, a clock counter is reset to zero. The clock threshold value options may include, but are not limited to, 16 clock cycles, 32 clock cycles or 64 clock cycles. At block 303, a number of clock cycles since the last TM packet in the TS output packet stream is counted. For example, the clock counter component 111 of FIG. 1 counts the number clock cycles generated by the clock frequency element 129 of FIG. 1. At block 305, it is determined that the TD packet is generated. At block 307, the number of clock cycles is compared with the clock threshold. At block 309, it is determined whether the number of clock cycles exceeds the clock threshold. If it is determined at block 309 that the number of clock cycles did not exceed the clock threshold, then at block 311, the generated TD packet is outputted into the TS output packet stream, which is followed by repeat from block 303. If it determined at block 309 that the number of clock cycles exceeds the clock threshold, then at block 313, a TM packet is generated and outputted along with the generated TD packet into the TS output packet stream. In one embodiment, the TM packet is appended to the generated TD packet. Method 300 then returns to block 303.

Figure 4:
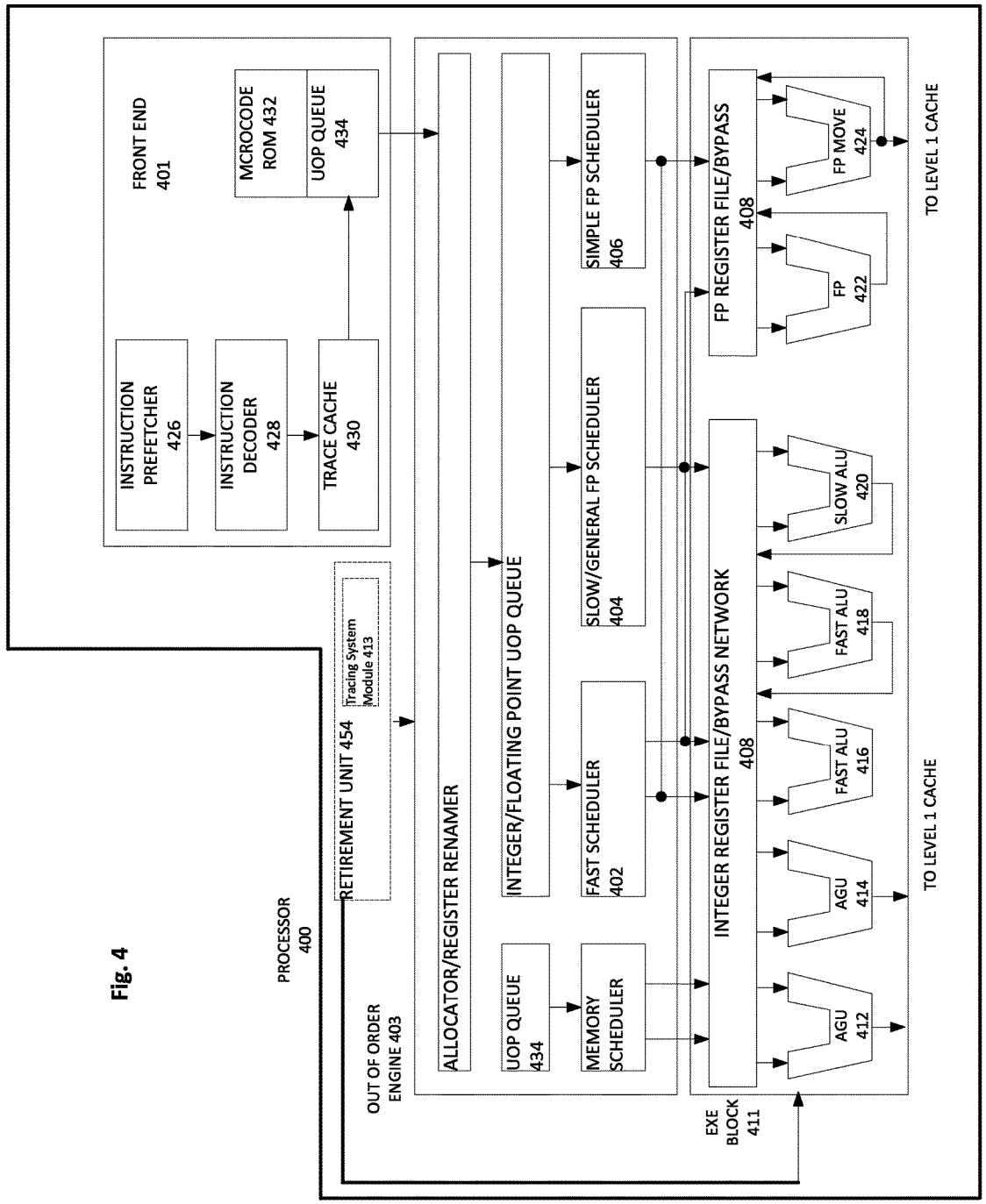
FIG. 4 is a block diagram illustrating a processor according to one embodiment.

FIG. 4 is a block diagram illustrating a micro-architecture for a processor 400 that includes logic circuits to perform instructions in accordance with one embodiment of the invention. In one embodiment, processor 400 outputs timing packets (TM) in a TS. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 401 is the part of the processor 400 that fetches instructions to be executed and prepares them to be used later in the processor pipeline. The front end 401 may include several units. In one embodiment, the instruction prefetcher 426 fetches instructions from memory and feeds them to an instruction decoder 428, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others use several micro-ops to complete the full operation. In one embodiment, if more than four micro-ops are needed to complete an instruction, the decoder 428 accesses the microcode ROM 432 to do the instruction. For one embodiment, an instruction can be decoded into a small number of micro ops for processing at the instruction decoder 428. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406 determine when a uop is ready to execute based on the readiness of their dependent input register operand sources and the availability of the execution resources the uops use to complete their operation. The fast scheduler 402 of one embodiment can schedule on each half of the main clock cycle while the other schedulers can schedule once per main processor clock cycle. The schedulers arbitrate for the dispatch ports to schedule uops for execution.

Register files 408, 410 sit between the schedulers 402, 404, 406, and the execution units 412, 414, 416, 418, 420, 422, 424 in the execution block 411. There is a separate register file 208, 410 for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the micro-instructions use to execute. The execution block 411 may include a TS component to generate TD packets. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 422, 424, execute floating point, MMX, SIMD, and SSE, or other operations. The floating point ALU 422 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 420 as the slow ALU 420 includes integer execution hardware for long latency type of operations, such as a multiplier, shifts, flag logic, and branch processing. Memory load/store operations are executed by the AGUs 412, 414. For one embodiment, the integer ALUs 416, 418, 420 are described in the context of performing integer operations on 64 bit data operands. In alternative embodiments, the ALUs 416, 418, 420 can be implemented to support a variety of data bits including 16, 32, 128, 256, etc. Similarly, the floating point units 422, 424 can be implemented to support a range of operands having bits of various widths. For one embodiment, the floating point units 422, 424 can operate on 128 bits wide packed data operands in conjunction with SIMD and multimedia instructions.

In one embodiment, the uops schedulers 402, 404, 406 dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are either contained in the same register file or different register files. Furthermore, in one embodiment, floating point and integer data may be stored in different registers or the same registers.

Figure 5A:
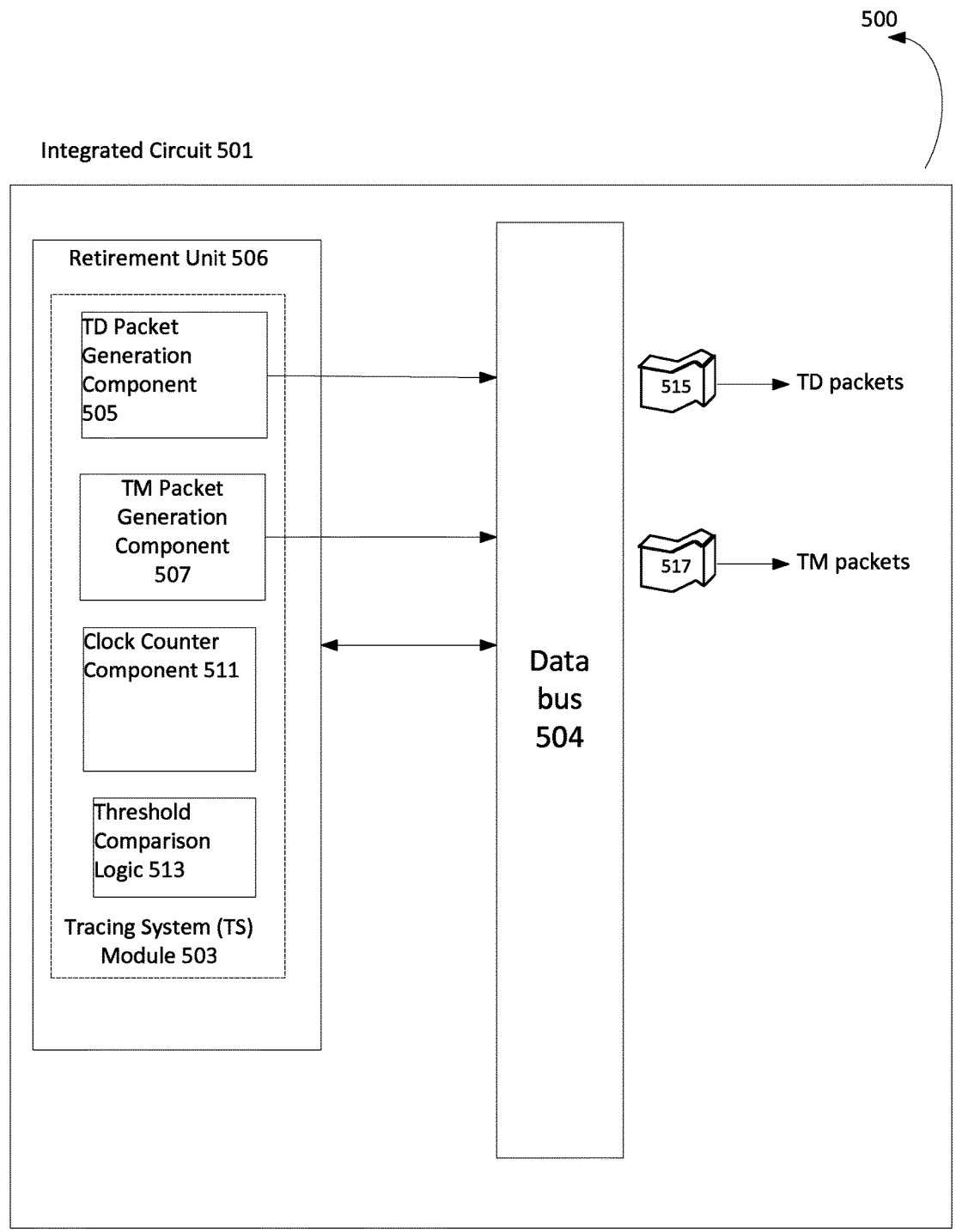
FIG. 5A illustrates an alternative exemplary architecture in accordance with which embodiments may operate.

FIG. 5A illustrates an alternative exemplary architecture in accordance with which embodiments may operate. In one embodiment, the integrated circuit 501 includes TS module 503 to trace behavior of a traced application, mode, or code region, as the instructions are executed by the integrated circuit 501; a retirement unit 506 to output TM packets in a TS. The retirement unit 506 may include a TD packet generation component 505 to generate a plurality of TD packets. The retirement unit 506 may also include a TM packet generation component 507 to generate a plurality of TM packets adjacent to the TD packets. The retirement unit 506 may also include a clock counter component 511, which counts a number of clock cycles elapsed between consecutive TM packets. The retirement unit 506 may further include a threshold comparison logic 513 to compare the number of counted clock cycles to a clock threshold value, and to send a command signal to the TM packet generation component 507 to generate and output the TM packet with the next TD packet based on the comparison. In one embodiment, the retirement unit 506 implements the tracing logic 503.

In one embodiment, the retirement unit 506 includes TS logic to implement the tracing module 503. In one embodiment, the TD logic implementing the tracing component 503 includes a state packet generation component 505, periodic sync point counter component 507 configuration component 509 and event packet generation component 511. In one embodiment, the state packet generation component 505 outputs packets, such as the TD packets 502 depicted on the data bus 504. In one embodiment, the event packet generation component 511 also outputs packets such as the TD packets 502 depicted on the data bus 504. In one embodiment, logic implementing the tracing component 503 may be implemented in hardware. In one embodiment, logic implementing the tracing component 503 may be implemented in microcode. In one embodiment, logic implementing the tracing component 503 may be implemented in a combination hardware and microcode.

In one embodiment, the integrated circuit is a Central Processing Unit (CPU). In one embodiment, the central processing unit is utilized for one of a tablet computing device or a smartphone.

In accordance with one embodiment, such an integrated circuit 501 thus initiates tracing (e.g., via tracing system module 503) for instructions of a traced application, mode, or code region, as the instructions are executed by the integrated circuit 501; generates a plurality of TD packets (e.g., via TD generation component 505); generate a plurality of TM packets adjacent to the TD packets (e.g. via TM generation component 507); count a number of clock cycles elapsed between consecutive TM packets (e.g. via clock counter component 511) and compare the number of counted clock cycles to a clock threshold value and to send a command signal to the TM packet generation component 507 to generate and output the TM packet with the next TD packet based on the comparison (e.g. via threshold comparison logic 513). In one embodiment, the integrated circuit 501 generates and outputs the TM packet with the next TD packet when the number of clock cycles exceeds the clock threshold value.

Figure 5B:
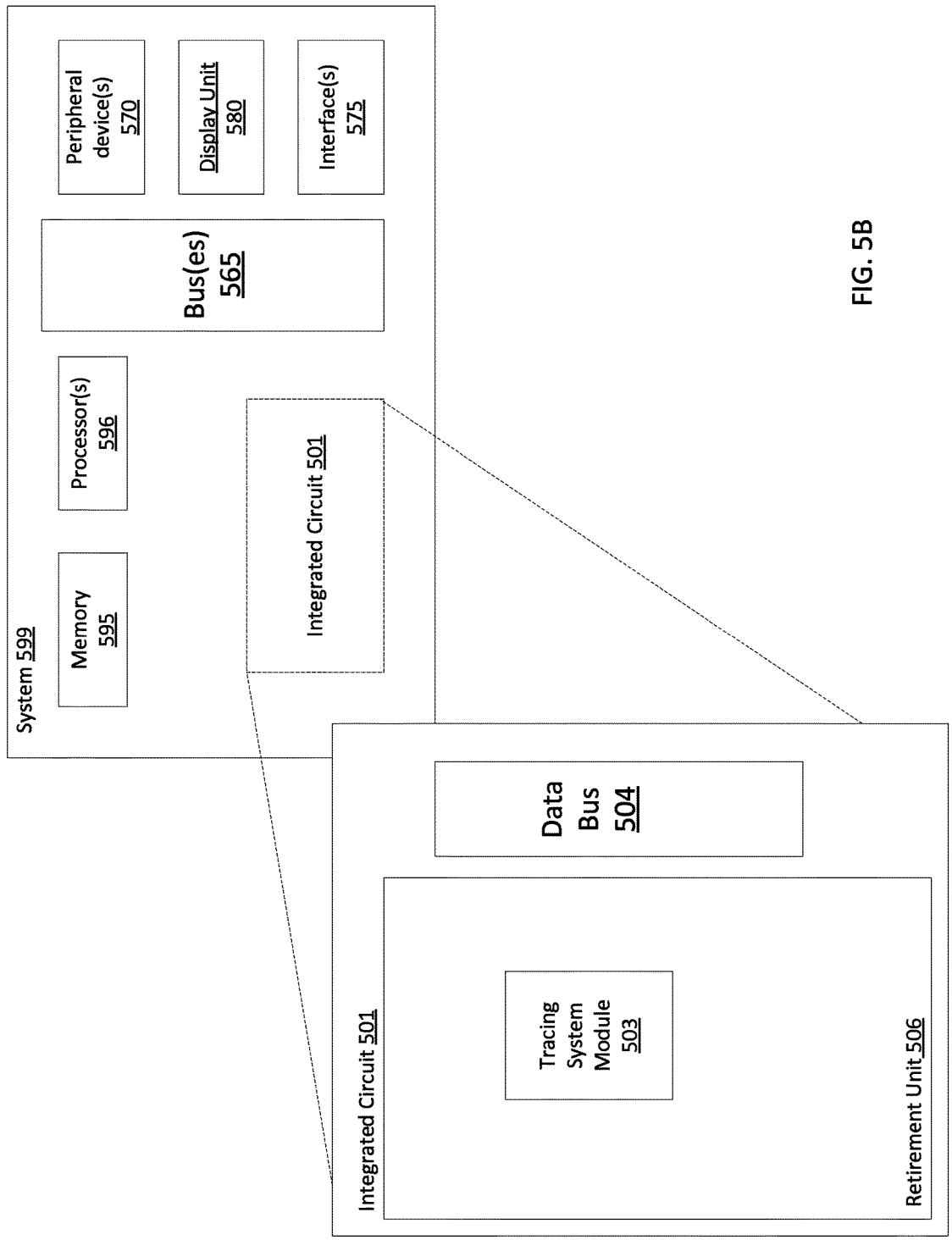
FIG. 5B shows a diagrammatic representation of a system in accordance with which embodiments may operate, be installed, integrated, or configured.

FIG. 5B shows a diagrammatic representation of a system 599 in accordance with which embodiments may operate, be installed, integrated, or configured.

In one embodiment, system 599 includes a memory 595 and a processor or processors 596. For example, memory 595 may store instructions to be executed and processor(s) 596 may execute such instructions. System 599 includes communication bus(es) 565 to transfer transactions, instructions, requests, and data within system 599 among a plurality of peripheral device(s) 570 communicably interfaced with one or more communication buses 565 and/or interface(s) 575. Display unit 580 is additionally depicted within system 599.

Distinct within system 599 is integrated circuit 501 which may be installed and configured in a compatible system 599, or manufactured and provided separately so as to operate in conjunction with appropriate components of system 599.

In accordance with one embodiment, system 599 includes at least a display unit 580 and an integrated circuit 501. The integrated circuit 501 may operate as, for example, a processor or as another computing component of system 599. In such an embodiment, the integrated circuit 501 of system 599 includes at least: a data bus 504, and tracing system module 503 including a state packet generation component (not shown) and event packet generation component (not shown) to generate a plurality of TD packets describing the traced instructions. In one embodiment, the TD packets include information describing a status of the processor and a synchronization point in the traced instructions.

In accordance with one embodiment, such a system 599 embodies a tablet or a smartphone, in which the display unit 580 is a touchscreen interface of the tablet or the smartphone; and further in which the integrated circuit 501 is incorporated into the tablet or smartphone.

Figure 6:
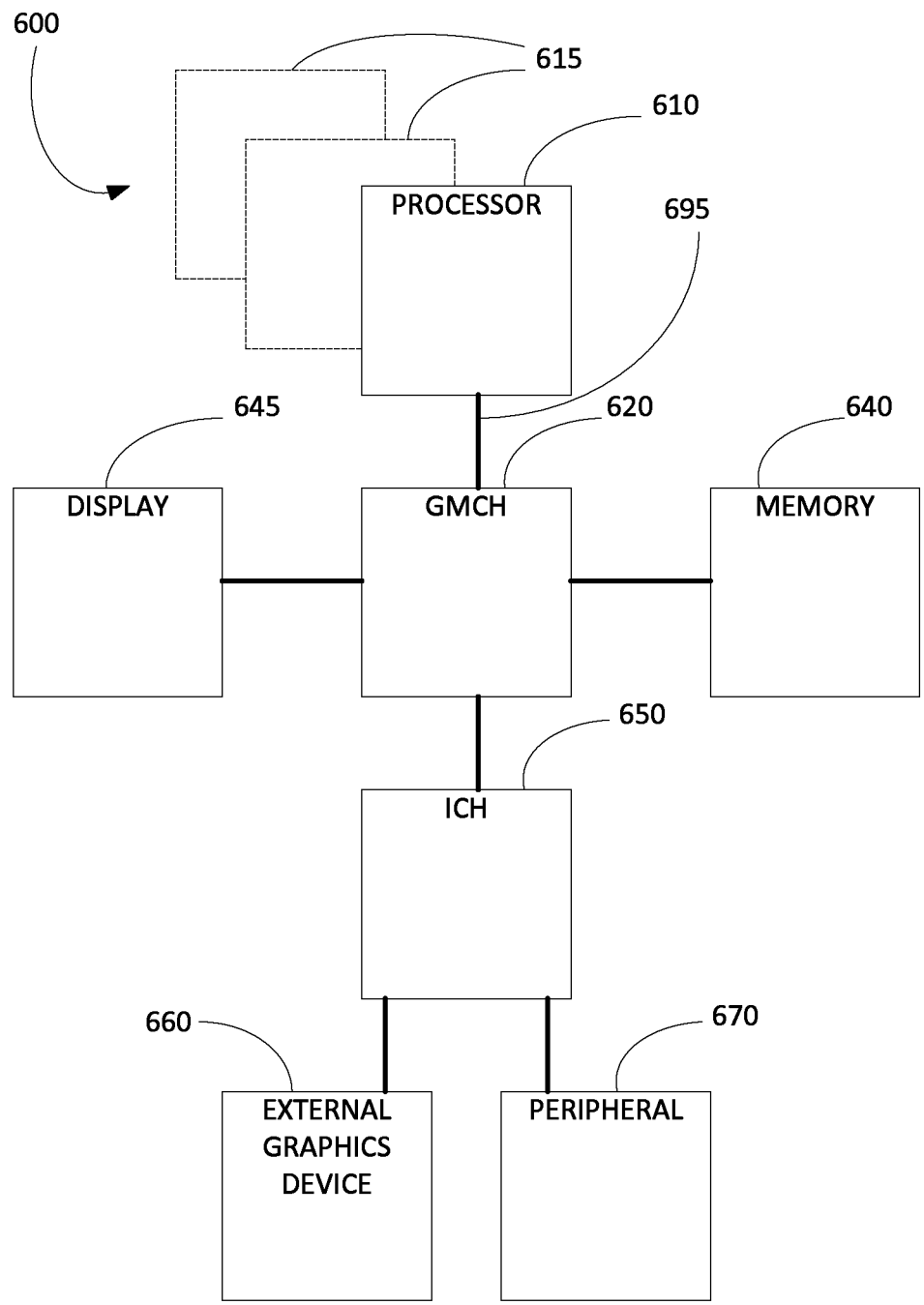
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, processors 610, 615 outputs timing packets (TM) in TS.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
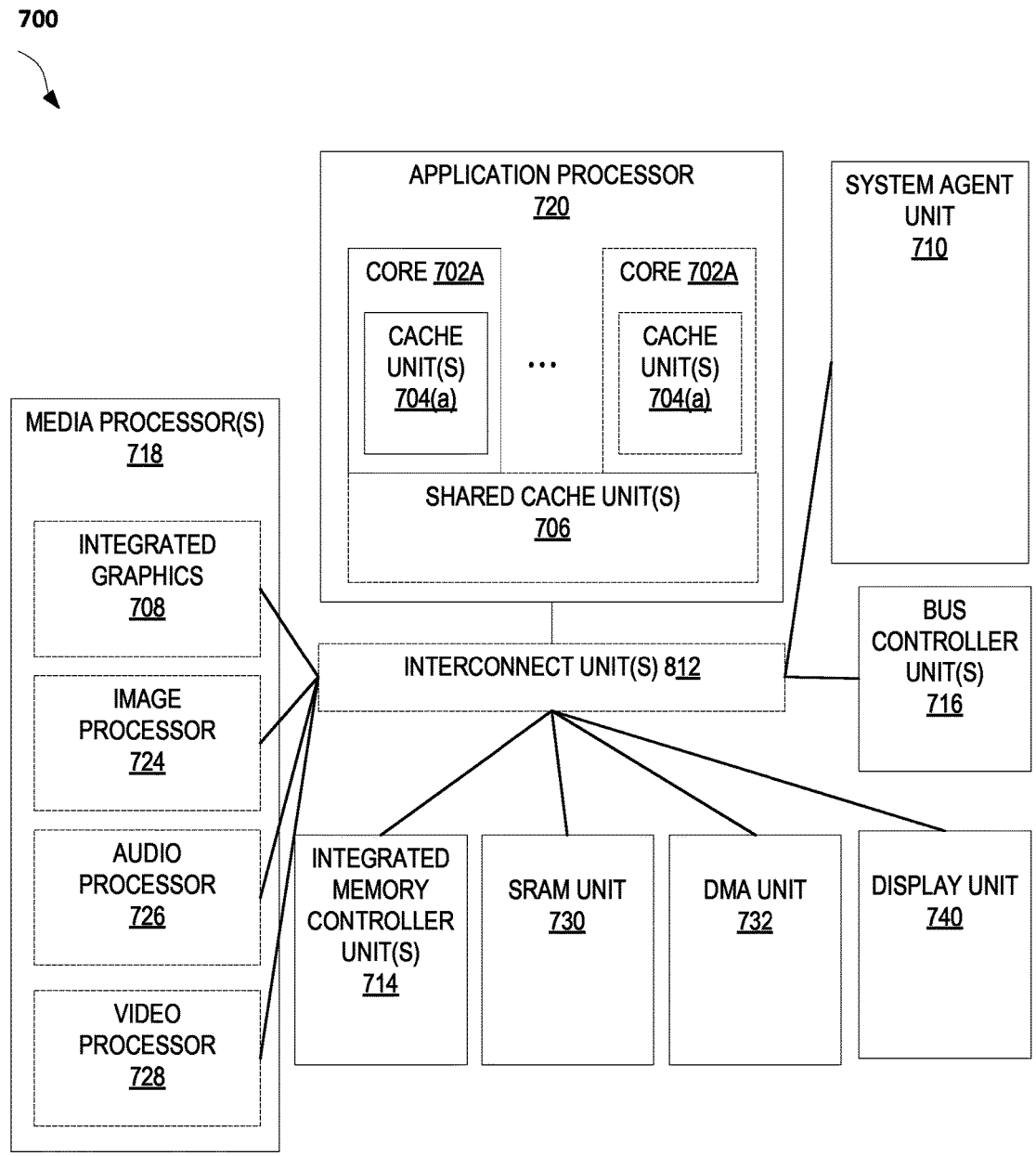
FIG. 7 is a block diagram of a system on chip (SoC) in accordance with an embodiment of the present disclosure.

Embodiments may be implemented in many different system types. FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, a memory module may be included in the integrated memory controller unit(s) 714. In another embodiment, the memory module may be included in one or more other components of the SoC 700 that may be used to access and/or control a memory. The application processor 720 may include an conditional branch, indirect branch and event execution logics as described in embodiments herein.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 720 may be from another company, such as ARM Holdings™, Ltd, MIPS™, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
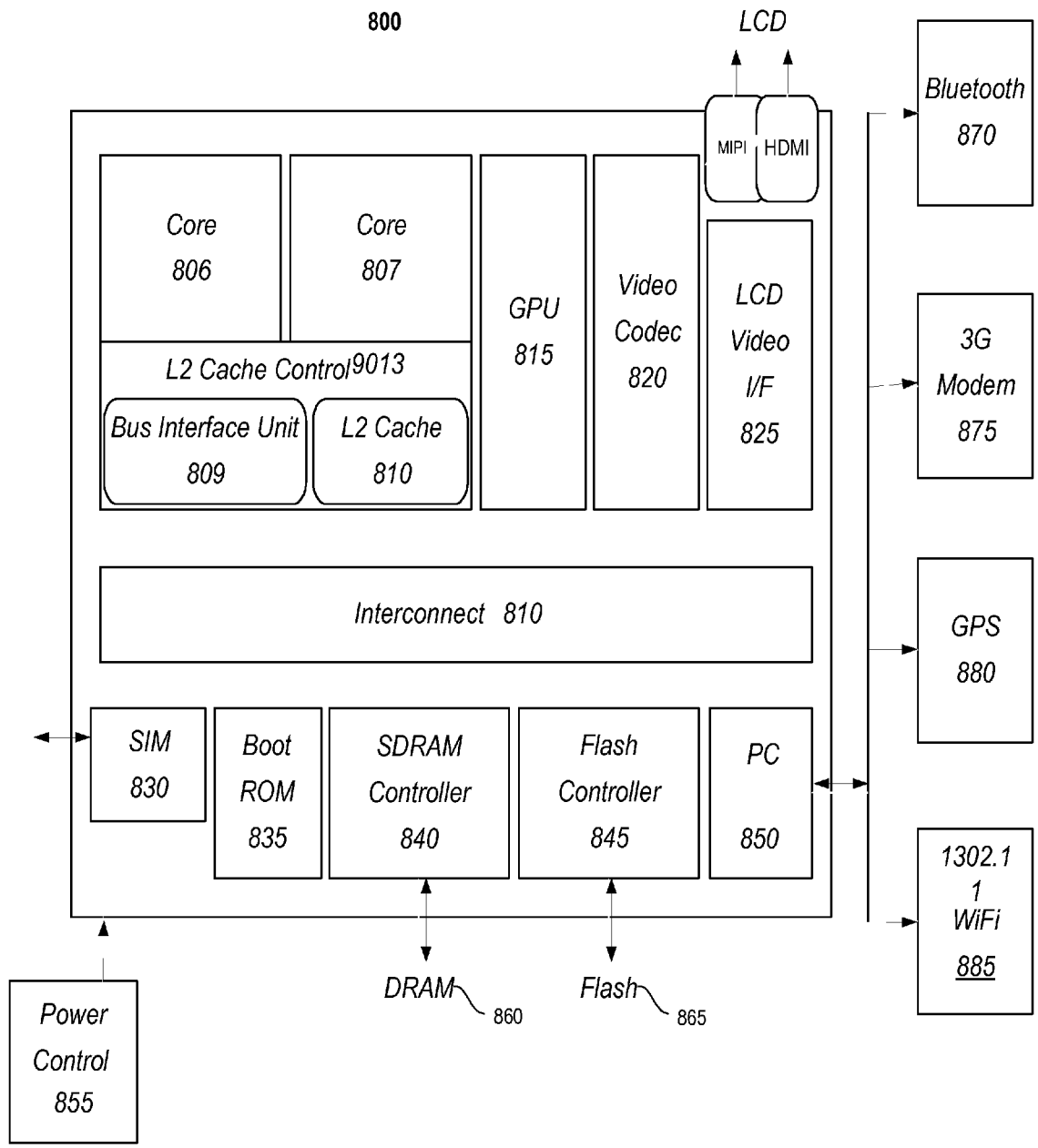
FIG. 8 is a block diagram of an embodiment of a system on-chip (SOC) design.

FIG. 8 is a block diagram of an embodiment of a system on-chip (SoC) design in accordance with the present disclosure. As a specific illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 core—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 808 and L2 cache 810 to communicate with other parts of system 800. Interconnect 810 includes an on-chip interconnect, such as an IOSF, AMBA, or other interconnect discussed above, which potentially implements one or more aspects of the described disclosure. In one embodiment, a conditional branch, indirect branch and event execution logics may be included in cores 806, 807.

Interconnect 810 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein. In addition, the system 800 illustrates peripherals for communication, such as a Bluetooth module 870, 3G modem 875, GPS 880, and Wi-Fi 885.

Figure 9:
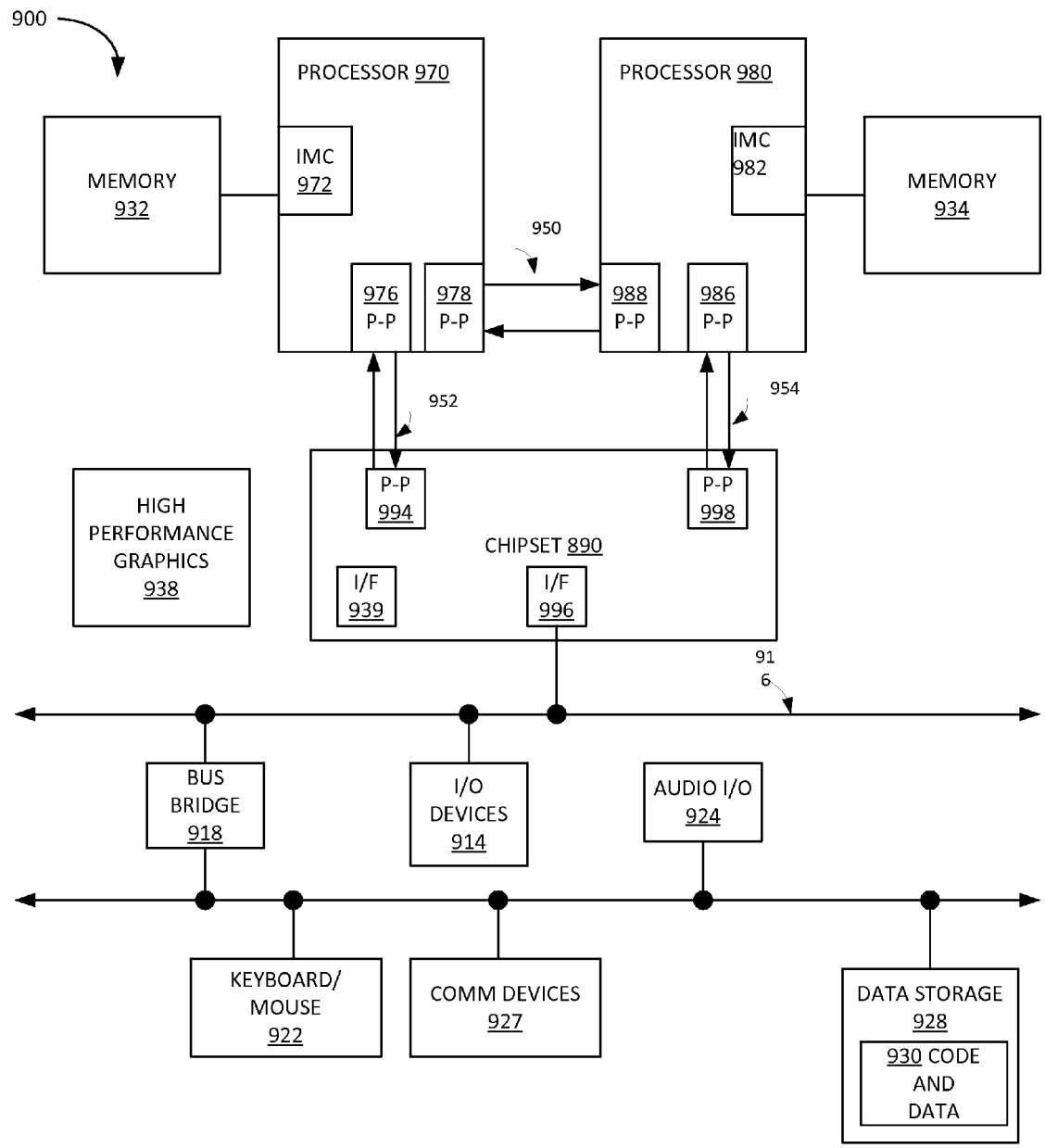
FIG. 9 illustrates a block diagram of a computer system according to one embodiment.

Referring now to FIG. 9, shown is a block diagram of a system 900 in accordance with an embodiment of the invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processors of the computing systems as described herein. In one embodiment, processors 970, 980 outputs timing packets (TM) in TS.

While shown with two processors 970, 980, it is to be understood that the scope of the disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970 and 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
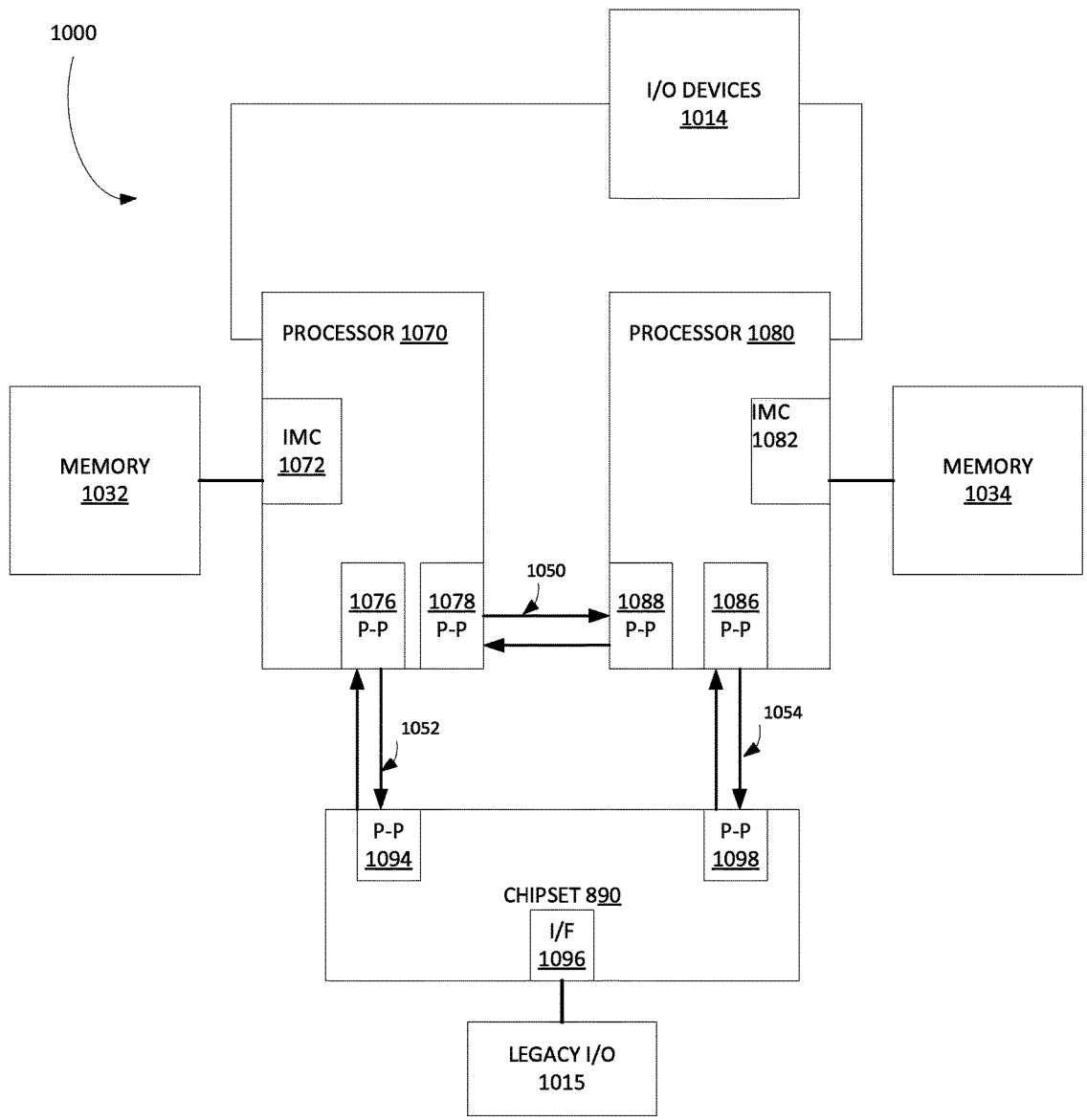
FIG. 10 illustrates a block diagram of a computer system according to one embodiment.

Referring now to FIG. 10, shown is a block diagram of a system 1000 in accordance with an embodiment of the invention. FIG. 10 illustrates processors 1070, 1080. In one embodiment, processors 1070, 1080 outputs timing packets (TM) in TS. Furthermore, processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnect 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
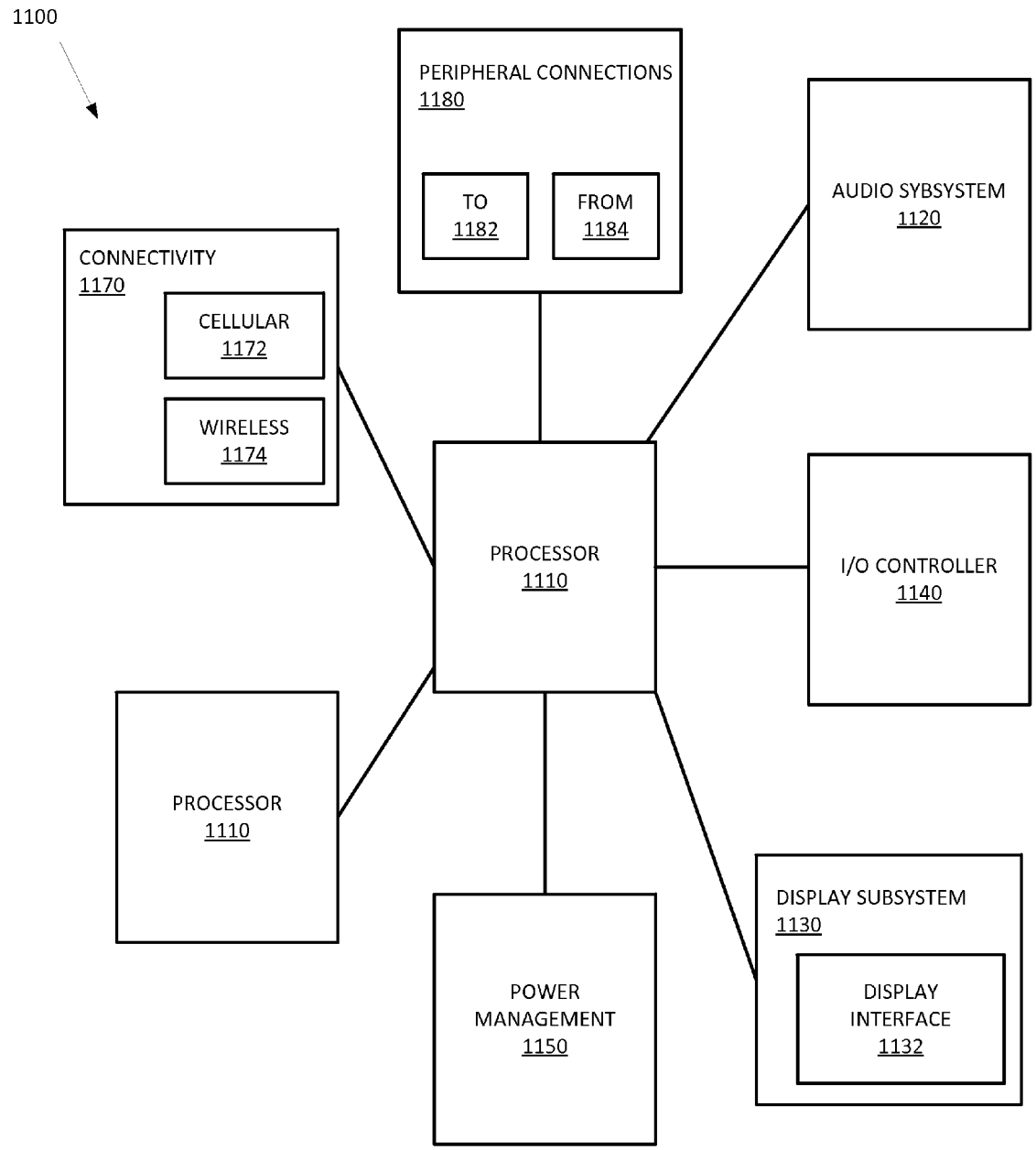
FIG. 11 illustrates block diagram of an embodiment of tablet computing device, a smartphone, or other mobile device in which touchscreen interface connectors are used.

FIG. 11 illustrates a block diagram 1100 of an embodiment of tablet computing device, a smartphone, or other mobile device in which touchscreen interface connectors may be used. Processor 1110 may output timing packets (TM) in TS. In addition, processor 1110 performs the primary processing operations. Audio subsystem 1120 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1110.

Display subsystem 1130 represents hardware (e.g., display devices) and software (e.g., drivers) components that provide a visual and/or tactile display for a user to interact with the tablet computing device or smartphone. Display subsystem 1130 includes display interface 1132, which includes the particular screen or hardware device used to provide a display to a user. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to the tablet computing device or smartphone through which a user might interact. In one embodiment, I/O controller 1140 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1150 that manages battery power usage, charging of the battery, and features related to power saving operation. Memory subsystem 1160 includes memory devices for storing information in the tablet computing device or smartphone. Connectivity 1170 includes hardware devices (e.g., wireless and/or wired connectors and communication hardware) and software components (e.g., drivers, protocol stacks) to the tablet computing device or smartphone to communicate with external devices. Cellular connectivity 1172 may include, for example, wireless carriers such as GSM (global system for mobile communications), CDMA (code division multiple access), TDM (time division multiplexing), or other cellular service standards). Wireless connectivity 1174 may include, for example, activity that is not cellular, such as personal area networks (e.g., Bluetooth), local area networks (e.g., WiFi), and/or wide area networks (e.g., WiMax), or other wireless communication.

Peripheral connections 1180 include hardware interfaces and connectors, as well as software components (e.g., drivers, protocol stacks) to make peripheral connections as a peripheral device ("to" 1182) to other computing devices, as well as have peripheral devices ("from" 1184) connected to the tablet computing device or smartphone, including, for example, a "docking" connector to connect with other computing devices. Peripheral connections 1180 include common or standards-based connectors, such as a Universal Serial Bus (USB) connector, DisplayPort including MiniDisplayPort (MDP), High Definition Multimedia Interface (HDMI), Firewire, etc.

Figure 12:
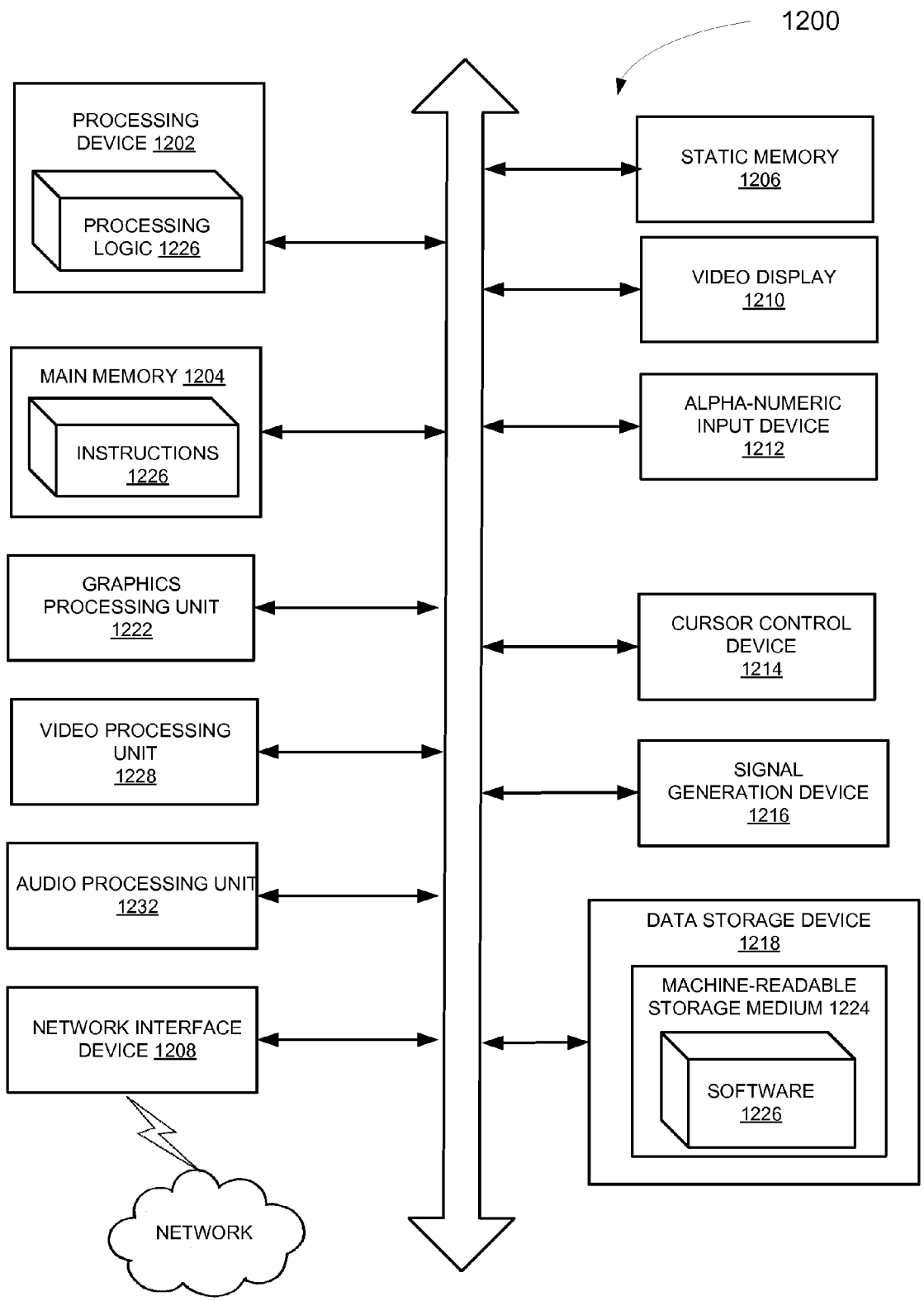
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 is the same as processing device 120 described with respect to FIG. 1A that implements the trace module 103 and scheduler and execution unit 102. Alternatively, the computing system 1200 can include other components as described herein.

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the trace component 103 and the scheduler and execution unit 102, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing device using thresholds to gate timing packet generation in a tracing system (TS) comprising a tracing (TD) module to generate and output a trace data (TD) packet into a packet log and generate and output a timing packet (TM) corresponding to the TD packet into the packet log when a number of clock cycles elapsed since an output of a previous TM packet exceeds a clock threshold value.

In Example 2, the subject matter of Example 1 can optionally include wherein the TM packet precedes the TD packet in the packet log.

In Example 3, the subject matter of any one of Examples 1-2 can optionally include wherein the TM packet is appended to the TD packet in the packet log.

In Example 4, the subject matter of any one of Examples 1-3 can optionally include wherein the clock threshold value comprises a pre-determined number of clock cycles.

In Example 5, the subject matter of any one of Examples 1-4 can optionally include wherein the TS module comprises a clock counter component to count the number of clock cycles and a threshold comparison component to compare the clock threshold value with the counted number of clock cycles.

In Example 6, the subject matter of any one of Examples 1-5 can optionally include wherein the TS module comprises a TD packet generation component to generate and output the TD packet into the packet log.

In Example 7, the subject matter of any one of Examples 1-6 can optionally include wherein the TS module comprise a TM packet generation component to generate and output the TM packet adjacent to the TD packet in the packet log when the number of clock cycles exceeds the clock threshold value, wherein the TM packet generation component is coupled to the TD packet generation component and the threshold comparison component.

In Example 8, the subject matter of any one of Examples 1-7 can optionally include wherein the clock counter component is reset to zero after the TM packet is outputted into the packet log.

Example 9 is a system using thresholds to gate timing packet generation in a tracing system (TS). and includes a memory and a processing device communicably coupled to the memory, the processing device includes a data bus and a tracing module (TD) communicably coupled to the data bus, the TS module to generate and output a trace data (TD) packet into a packet log and generate and output a timing packet (TM) corresponding to the TD packet into the packet log when a number of clock cycles elapsed since an output of a previous TM packet exceeds a clock threshold value.

In Example 10, the subject matter of Example 9 can optionally include wherein the TM packet is outputted together with the TD packet into the packet log.

Example 11 is a method using thresholds to gate timing packet generation in a tracing system (TS) comprising generating and outputting a trace data (TD) packet into a packet log and generating and outputting a timing packet (TM) corresponding to the TD packet into the packet log when a number of clock cycles elapsed since an output of a previous TM packet exceeds a clock threshold value.

In Example 12, the subject matter of Example 11 can optionally include wherein the TM packet precedes the TD packet into the packet log.

In Example 13, the subject matter of any one of Examples 11-12 can optionally include wherein the TM packet is appended to the TD packet in the packet log.

In Example 14, the subject matter of any one of Examples 11-13 can optionally include wherein the clock threshold value comprises a pre-determined number of clock cycles In Example 15, the subject matter of any one of Examples 11-14 can optionally include counting the number of clock cycles and comparing the clock threshold value to the counted number of clock cycles Example 16 is a non-transitory machine-readable storage medium for using thresholds to gate timing packet generation in a tracing system (TS).

In Example 16, the non-transitory machine-readable medium includes data that, when accessed by a processing device, cause the processing device to perform operations comprising generating and outputting a trace data (TD) packet into a packet log and generating and outputting a timing packet (TM) corresponding to the TD packet into the packet log when a number of clock cycles elapsed since an output of a previous TM packet exceeds a clock threshold value.

In Example 17, the subject matter of Example 16 can optionally include wherein the TM packet precedes the TD packet into the packet log.

In Example 18, the subject matter of any one of Examples 16-17 can optionally include wherein the TM packet is appended to the TD packet in the packet log.

In Example 19, the subject matter of any one of Examples 16-18 can optionally include wherein the clock threshold value comprises a pre-determined number of clock cycles.

In Example 20, the subject matter of any one of Examples 16-19 can optionally include wherein the operations further comprising counting the number of clock cycles and comparing the clock threshold value to the counted number of clock cycles.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics maybe combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a tracing system (TS) module to:
generate and output a trace data (TD) packet into a packet log; and
generate and output a timing packet (TM) corresponding to the TD packet into the packet log responsive to a number of clock cycles elapsed since an output of a previous TM packet exceeding a clock threshold value.

2. The processing device of claim 1 wherein the TM packet precedes the TD packet in the packet log.

3. The processing device of claim 1 wherein the TM packet is appended to the TD packet in the packet log.

4. The processing device of claim 1 wherein the clock threshold value comprises a pre-determined number of clock cycles.

5. The processing device of claim 1 wherein the TS module comprises a clock counter component to count the number of clock cycles and a threshold comparison component to compare the clock threshold value with the counted number of clock cycles.

6. The processing device of claim 5 wherein the TS module comprises a TD packet generation component to generate and output the TD packet into the packet log.

7. The processing device of claim 6 wherein the TS module comprises a TM packet generation component to generate and output the TM packet adjacent to the TD packet in the packet log in response to the number of clock cycles exceeding the clock threshold value, wherein the TM packet generation component is coupled to the TD packet generation component and the threshold comparison component.

8. The processing device of claim 7 wherein the clock counter component is reset to zero in response to the TM packet outputted into the packet log.

9. A system comprising:
a memory;
a data bus; and
a processing device communicably coupled to the memory and the data bus, wherein the processing device comprises:
tracing system (TS) module communicably coupled to the data bus, the TS module to:
generate and output a trace data (TD) packet into a packet log; and
generate and output a timing packet (TM) corresponding to the TD packet into the packet log responsive to a number of clock cycles elapsed since an output of a previous TM packet exceeding a clock threshold value.

10. The system comprising of claim 9 wherein the TM packet precedes the TD packet into the packet log.

11. A method of a processing device comprising:
generating and outputting a trace data (TD) packet into a packet log; and
generating and outputting a timing packet (TM) corresponding to the TD packet into the packet log responsive to a number of clock cycles elapsed since an output of a previous TM packet exceeding a clock threshold value.

12. The method of claim 11 wherein the TM packet precedes the TD packet into the packet log.

13. The method of claim 11 wherein the TM packet is appended to the TD packet in the packet log.

14. The method of claim 11 wherein the clock threshold value comprises a pre-determined number of clock cycles.

15. The method of claim 11 further comprising counting the number of clock cycles and comparing the clock threshold value to the counted number of clock cycles.

16. A non-transitory machine-readable storage medium including data that, when accessed by a processing device, cause the processing device to perform operations comprising:
  generating and outputting a trace data (TD) packet into a packet log; and
  generating and outputting a timing packet (TM) corresponding to the TD packet into the packet log responsive to a number of clock cycles elapsed since an output of a previous TM packet exceeding a clock threshold value.

17. The non-transitory machine-readable storage medium of claim 16 wherein the TM packet precedes the TD packet into the packet log.

18. The non-transitory machine-readable storage medium of claim 16 wherein the TM packet is appended to the TD packet in the packet log.

19. The non-transitory machine-readable storage medium of claim 16 wherein the clock threshold value comprises a pre-determined number of clock cycles.

20. The non-transitory machine-readable storage medium of claim 16 wherein the operations further comprising counting the number of clock cycles and comparing the clock threshold value to the counted number of clock cycles.

* * * * *